(12) United States Patent
Liu et al.

(10) Patent No.: US 11,115,188 B2
(45) Date of Patent: Sep. 7, 2021

(54) BLOCKCHAIN-BASED DATA PROCESSING METHOD, APPARATUS, AND BLOCKCHAIN NODE

(71) Applicant: Advanced New Technologies Co., Ltd., Grand Cayman (KY)

(72) Inventors: Zheng Liu, Hangzhou (CN); Lichun Li, Hangzhou (CN); Shan Yin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/776,067

(22) Filed: Jan. 29, 2020

(65) Prior Publication Data

US 2020/0169386 A1    May 28, 2020

Related U.S. Application Data

(63) Continuation of application No. PCT/CN2020/070628, filed on Jan. 7, 2020.

(30) Foreign Application Priority Data

Apr. 29, 2019    (CN) .......................... 201910355481.0

(51) Int. Cl.
    *H04L 9/06*    (2006.01)
    *H04L 9/32*    (2006.01)

(52) U.S. Cl.
    CPC .......... *H04L 9/0637* (2013.01); *H04L 9/3218* (2013.01); *G06Q 2220/10* (2013.01); *H04L 2209/38* (2013.01)

(58) Field of Classification Search
    CPC . H04L 9/06; H04L 9/0637; H04L 9/32; H04L 9/3218; H04L 9/3236; G06Q 20/38; G06F 17/30115; G06F 17/30206
    See application file for complete search history.

(56) References Cited

U.S. PATENT DOCUMENTS

| | | | |
|---|---|---|---|
| 10,419,209 B1* | 9/2019 | Griffin | ................. H04L 9/3247 |
| 10,432,405 B1* | 10/2019 | Hu | ........................ H04L 9/3242 |
| 2018/0276668 A1* | 9/2018 | Li | ......................... G06Q 20/401 |
| 2018/0293556 A1* | 10/2018 | Hyun | ................. G06Q 20/4014 |
| 2019/0081793 A1* | 3/2019 | Martino | ............... G06Q 20/065 |
| 2019/0190719 A1* | 6/2019 | van de Ruit | ............ G06F 21/64 |
| 2019/0199515 A1* | 6/2019 | Carver | ................. H04L 9/3239 |

(Continued)

FOREIGN PATENT DOCUMENTS

| | | |
|---|---|---|
| CN | 108171494 | 6/2018 |
| CN | 108269072 | 7/2018 |

(Continued)

OTHER PUBLICATIONS

Machine translation of patent application CN 201811101747 A1, Alibaba Group Holding Ltd. (Year: 2019).*

(Continued)

*Primary Examiner* — Shanto Abedin
(74) *Attorney, Agent, or Firm* — Fish & Richardson P.C.

(57) ABSTRACT

Implementations of the present specification provide a blockchain-based data processing method, apparatus, and computer-readable medium. The method includes obtaining transaction data to be processed; and in response to determining that the transaction data includes a plurality pieces of proof data, invoking a verification program deployed in the blockchain and verifying the plurality pieces of proof data in parallel.

23 Claims, 7 Drawing Sheets

(56) References Cited

U.S. PATENT DOCUMENTS

| | | | |
|---|---|---|---|
| 2019/0229919 A1* | 7/2019 | Gurkan | H04L 9/0637 |
| 2019/0251187 A1* | 8/2019 | Lin | G06F 16/27 |
| 2019/0251533 A1* | 8/2019 | Xu | G06Q 20/12 |
| 2019/0268142 A1* | 8/2019 | Leker | H04L 63/126 |
| 2020/0074424 A1* | 3/2020 | Motylinski | G06Q 20/065 |
| 2020/0162263 A1* | 5/2020 | Iyer | H04L 9/3236 |
| 2020/0410491 A1* | 12/2020 | Ronnow | G06Q 20/401 |

FOREIGN PATENT DOCUMENTS

| | | |
|---|---|---|
| CN | 108681583 | 10/2018 |
| CN | 108694575 | 10/2018 |
| CN | 109325747 | 2/2019 |
| CN | 109583886 | 4/2019 |
| CN | 109584055 | 4/2019 |
| CN | 110263580 | 9/2019 |
| TW | I637619 | 10/2018 |
| WO | WO 2018205729 | 11/2018 |

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
International Search Report and Written Opinion in PCT Appln. No. PCT/CN2020/070628, dated Apr. 8, 2020, 10 pages (full machine translation).

\* cited by examiner

BLOCKCHAIN-BASED DATA PROCESSING METHOD, APPARATUS, AND BLOCKCHAIN NODE

CROSS-REFERENCE TO RELATED APPLICATIONS

This application is a continuation of PCT Application No. PCT/CN2020/070628, filed on Jan. 7, 2020, which claims priority to Chinese Patent Application No. 201910355481.0, filed on Apr. 29, 2019, and each application is hereby incorporated by reference in its entirety.

TECHNICAL FIELD

Implementations of the present specification relate to the field of computer technologies, and in particular, to a blockchain-based data processing method and apparatus, and a blockchain node.

BACKGROUND

The blockchain technology is a distributed database technology. By using cryptography and consensus mechanism, the blockchain technology ensures that data cannot be tampered with or forged. As computer and Internet technologies develop, the blockchain technology is popular due to its advantages of decentralization, openness and transparency, tamper-resistance, trustworthiness, etc. It has been widely used in numerous fields such as smart contract, securities transaction, e-commerce, the Internet of Things, social communication, file storage, proof of existence, identity verification, and equity crowdfunding.

In related technologies, the blockchain can protect privacy. Transaction data includes ciphertext data, such as input asset ciphertext data, output asset ciphertext data, transaction amount ciphertext data, etc. In such case, the transaction data usually further includes one or more pieces of proof data.

When processing the transaction data, a consensus blockchain node in a blockchain network usually verifies the one or more pieces of proof data in the transaction data in series. It usually takes a long time to verify the proof data. Consequently, a speed of processing the transaction data is reduced and an overall throughput of the blockchain is affected.

SUMMARY

An objective of implementations of the present specification is to provide a blockchain-based data processing method and apparatus, and a blockchain node, to increase a speed of processing transaction data.

To achieve the previous objective, one or more implementations of the present specification provide the following technical solutions:

According to a first aspect of one or more implementations of the present specification, a blockchain-based data processing method is provided, where the method is applied to a consensus blockchain node and includes the following: obtaining transaction data to be processed; and when the transaction data includes a plurality of proof data, invoking a verification program deployed in the blockchain, to verify the plurality of proof data in parallel.

According to a second aspect of one or more implementations of the present specification, a blockchain-based data processing apparatus is provided, where the apparatus is applied to a consensus blockchain node and includes the following: an acquisition unit, configured to obtain transaction data to be processed; and a verification unit, configured to: when the transaction data includes a plurality of proof data, invoke a verification program deployed in the blockchain, to verify the plurality of proof data in parallel.

According to a third aspect of one or more implementations of the present specification, a blockchain node is provided, where the blockchain node includes the following: a memory, configured to store a computer instruction; and a processor, configured to execute the computer instruction to implement the method steps according to the first aspect.

As can be seen from the technical solutions provided in the previous implementations of the present specification, in some implementations of the present specification, the consensus blockchain node can obtain the transaction data to be processed; and when the transaction data includes a plurality of proof data, invoke a verification program deployed in the blockchain, to verify the plurality of proof data in parallel. As such, the verification program deployed in the blockchain can verify the plurality of proof data in the transaction data in parallel, thereby increasing a speed of processing the transaction data and increasing an overall throughput of the blockchain.

BRIEF DESCRIPTION OF DRAWINGS

To describe technical solutions in implementations of the present specification or in the existing technology more clearly, the following briefly describes the accompanying drawings needed for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

The following clearly describes the technical solutions in some implementations of the present specification with reference to the accompanying drawings in some implementations of the present specification. Apparently, the described implementations are merely some but not all of the implementations of the present specification. All other implementations obtained by a person of ordinary skill in the art based on the implementations of the present specification without creative efforts shall fall within the protection scope of the present specification.

The implementations of the present specification provide a blockchain-based data processing system. A blockchain can be established between individual users, groups, or institutions based on the blockchain technology, so that the individual users, groups, or institutions join the blockchain and become members of the blockchain. The blockchain can be a distributed ledger that organizes a plurality of data blocks in a chain structure in chronological order and ensures security, traceability and tamper-resistance by using a cryptographic algorithm. The blockchain can be, for example, a public blockchain, a Consortium blockchain, or a private blockchain. The blockchain can be implemented by using an unspent transaction output (UTXO) model, or can be implemented by using an account model.

The data processing system can include a blockchain network. The blockchain network can include a peer-to-peer (P2P) network, etc. The blockchain network can include a plurality of blockchain nodes. Each member joining the blockchain can include at least one blockchain node in the blockchain network. The data processing system can further include a blockchain client. Each blockchain client can correspond to at least one blockchain node, and each blockchain node can correspond to at least one blockchain client. A blockchain client and a blockchain node having a mapping relationship can belong to the same member. The blockchain client can be, for example, a device such as a server, a mobile phone, a tablet computer, or a personal computer, or can be a system that includes a plurality of devices, for example, a server cluster consisting of a plurality of servers.

Figure 1:
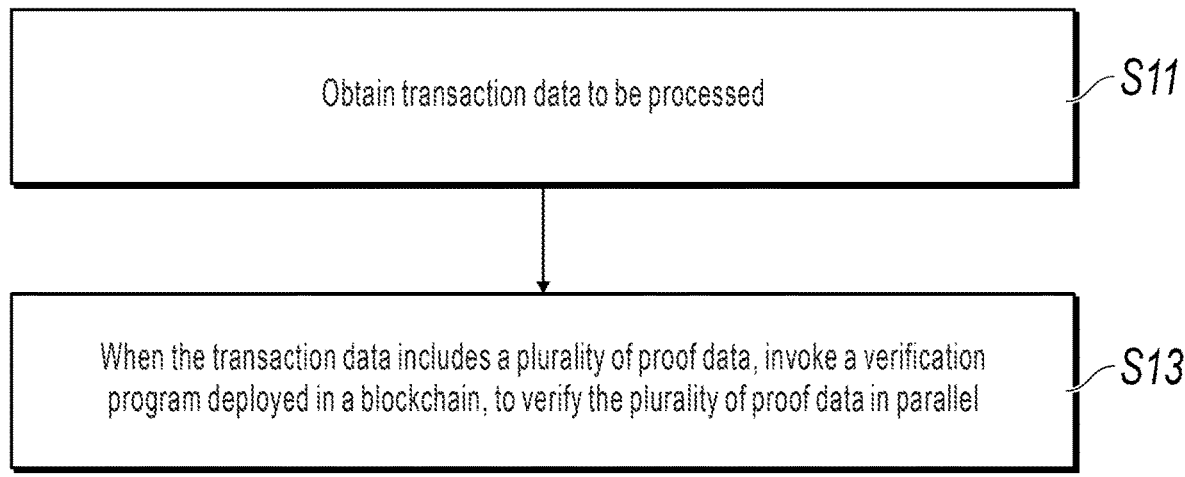
FIG. 1 is a flowchart illustrating a data processing method, according to an implementation of the present specification.

Based on the data processing system, the present specification provides an implementation of the data processing method. Referring to FIG. 1, the implementation takes a consensus blockchain node as an execution body and can include the following steps.

S11: Obtain transaction data to be processed.

In some implementations, a user can create transaction data by using a blockchain client. The blockchain client can send the created transaction data to the corresponding blockchain node. The blockchain node can receive the transaction data; can store the transaction data in its own transaction pool; and can broadcast the transaction data to the blockchain network so that other blockchain nodes in the blockchain network can receive the transaction data and store it in their own transaction pools. The transaction data can include transaction data in a narrow sense and transaction data in a broad sense. The transaction data in a narrow sense includes transaction data that enables value transfer, such as transaction data of a transfer transaction. The transaction data in a broad sense includes business data that can realize business intents, such as rentals, certificates, vehicle schedules, insurance claims, etc.

The blockchain can protect privacy, for example, for an account balance, a transaction amount, a transaction input, a transaction output, etc. Therefore, the transaction data can include ciphertext data. For example, when the blockchain is implemented by using the UTXO model, the transaction data can include ciphertext data of at least one input asset and ciphertext data of at least one output asset. The assets here can be understood as digital currencies, such as bitcoins, Monero coins, etc. When the blockchain is implemented by using an account model, the transaction data can include ciphertext data of the transaction amount. Because the data in the transaction data is ciphertext data, the transaction data can further include at least one piece of proof data. For example, when the blockchain is implemented by using the UTXO model, the proof data can include at least one of the following: first proof data, used to verify that an input asset of a transaction exists and has not been used; second proof data, used to verify that an initiator has permission to use the input asset of the transaction; or third proof data, used to verify that the input asset of the transaction is equal to an output asset. When the blockchain is implemented by using an account model, the proof data can include at least one of the following: fourth proof data, used to verify that a transaction amount is not less than 0; or fifth proof data, used to verify that the transaction amount is not greater than an account balance of the initiator. The proof data can include zero knowledge proof data. The zero knowledge proof data can be implemented based on the zero knowledge proof technology. Based on the zero knowledge proof technology, a certifier is able to convince a verifier that a certain assertion is correct without providing the verifier with any useful information. The zero knowledge proof technology can be implemented, for example, based on the zkSNARK scheme. The zero knowledge proof technology can further include a range proof technology. Based on the range proof technology, a certifier is able to convince a verifier that a certain number is within a certain reasonable range without providing the verifier with any useful information. The range proof technology can be implemented, for example, based on the Bulletproofs scheme or the Borromean ring signature scheme.

In some implementations, when a consensus trigger condition (e.g., after a specific time period) is satisfied, one of the blockchain nodes in the blockchain network can be selected as a consensus blockchain node based on a consensus mechanism. In practice, the consensus mechanism can be implemented based on algorithms such as Proof of Work (POW), Proof of Stake (POS), Delegated Proof of Stake (DPOS), or Practical Byzantine Fault Tolerance (PBFT). The consensus blockchain node can obtain at least one piece of to-be-processed transaction data from the transaction pool. The obtained transaction data can include one or more pieces of proof data.

S13: When the transaction data includes a plurality of proof data, invoke a verification program deployed in the blockchain, to verify the plurality of proof data in parallel.

In some implementations, a verification program can be deployed in the blockchain. An input parameter of the verification program can include a plurality of proof data in the transaction data. The plurality of proof data in the transaction data can be verified in parallel by invoking the verification program. When the blockchain is implemented by using the UTXO model, the verification program can be a script in the blockchain. When the blockchain is implemented by using the account model, the verification program can be a smart contract in the blockchain. The smart contract can be a native smart contract or a customized smart contract. The customized smart contract can be a smart contract developed by a technician or programmer by using the code.

In some implementations, the consensus blockchain node can process the at least one piece of transaction data; can create a data block that includes the at least one piece of transaction data after processing is complete; and can store the created data block as a new data block on the blockchain. The consensus blockchain node processes the at least one piece of transaction data in series to alleviate a transaction conflict. The process of processing the transaction data by the consensus blockchain node can include, verifying proof data, updating an account balance, updating an account asset, etc. In addition, during processing of each piece of transaction data, when the transaction data includes a plurality of proof data, the consensus blockchain node can invoke a verification program deployed in the blockchain by using the plurality of proof data as input parameters, to verify the plurality of proof data in parallel, thereby increasing a speed of processing the transaction data and increasing an overall throughput of the blockchain; when the transaction data includes one piece of proof data, the consensus blockchain node can directly verify the proof data. It is worthwhile to note that, the consensus blockchain node can obtain the verification program from the blockchain; and can locally execute the verification program to invoke the verification program.

Figure 2:
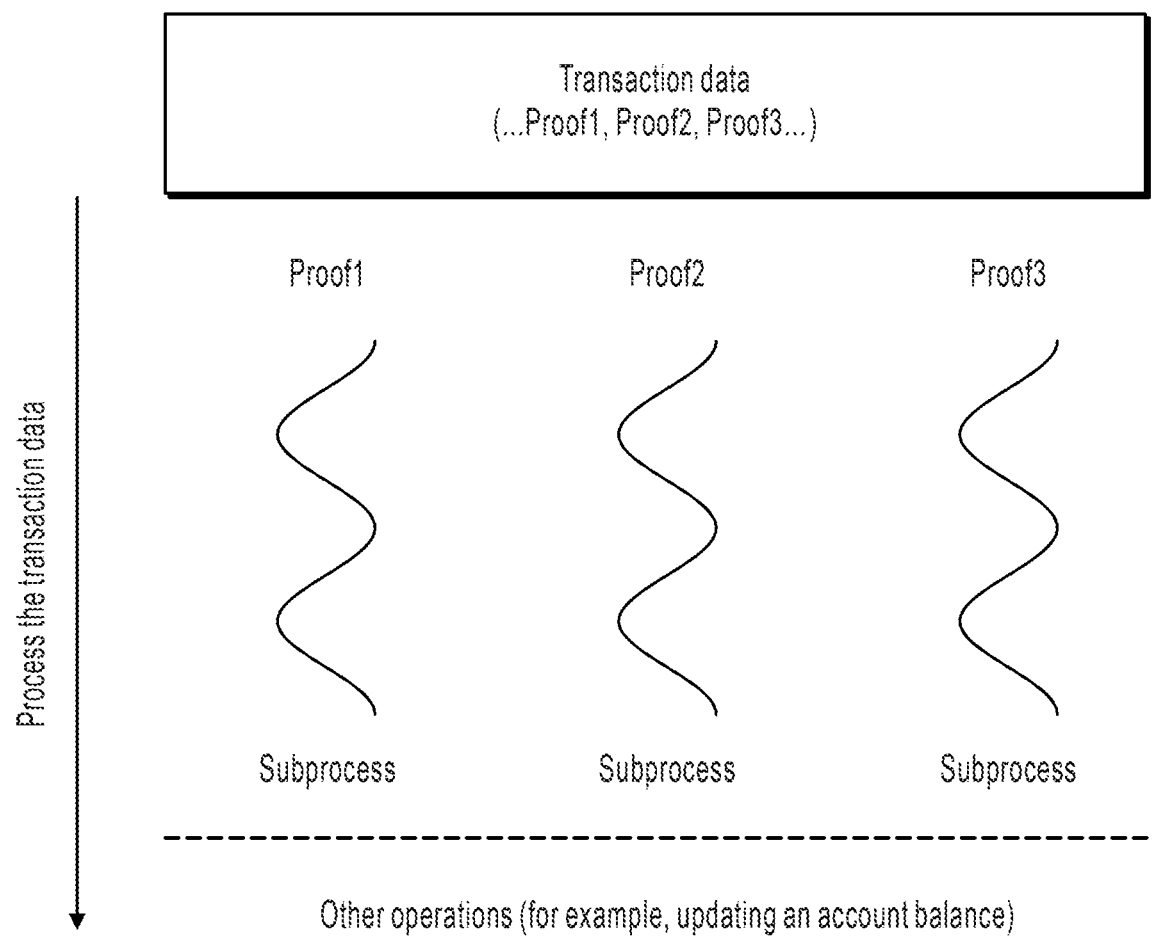
FIG. 2 is a schematic diagram of verifying a plurality of proof data in parallel by using multiple processes, according to an implementation of the present specification.

References are made to FIG. 2. In an implementation form of the present implementation, by invoking the verification program deployed in the blockchain, the consensus blockchain node can verify the plurality of proof data in the transaction data in parallel by using a plurality of processes. Specifically, based on the number of pieces of proof data in the transaction data, the main process of the consensus blockchain node can create a plurality of subprocesses. Each subprocess can verify at least one piece of the plurality of proof data. The number of created subprocesses can be less than or equal to the number of pieces of proof data in the transaction data. The specific number of created subprocesses can be considered comprehensively based on a calculation capability of the blockchain node and a processing timeliness demand of the transaction data. After all proof data in the transaction data has been verified, the main process can destroy the plurality of created subprocesses. Because the plurality of subprocesses can be executed in parallel, the plurality of proof data in the transaction data can be verified in parallel. It is worthwhile to note that, a process is a basic unit for allocating resources (CPU, memory, etc.). One process can include at least one thread which shares all resources of the process. One thread usually belongs to one process. In the present implementation, the execution body of S11 can be understood as the main process of the consensus blockchain node.

In an example scenario, the main process can allocate the plurality of proof data in the transaction data to the plurality of created subprocesses at a time. Each subprocess can obtain at least one piece of proof data allocated to the subprocess by the main process; can verify the allocated proof data; and can feed back a verification result to the main process. For example, the transaction data can include N pieces of proof data, where N is a natural number greater than 1. The main process can create N subprocesses and can allocate one piece of proof data to each subprocess. Each subprocess can obtain the proof data allocated to the subprocess by the main process; can verify the allocated proof data; and can feed back a verification result to the main process. For another example, the transaction data can include N pieces of proof data, where N is a natural number greater than 1. The main process can create M subprocesses, where M is a natural number less than N. The main process can select one or more subprocesses from the M subprocesses, and allocate a plurality of proof data to the selected subprocesses; and can allocate one piece of proof data to the remaining subprocesses. Each subprocess can obtain the proof data allocated to the subprocess by the main process; can verify the allocated proof data; and can feed back a verification result to the main process.

In another example scenario, the main process can dynamically allocate the plurality of proof data in the transaction data to the plurality of created subprocesses. Specifically, the main process can allocate one piece of proof data to each subprocess. Each subprocess can obtain the proof data allocated to the subprocess by the main process; can verify the allocated proof data; and can feed back a verification result to the main process. After receiving the verification result fed back by the subprocess, the main process can select one piece of proof data from the remaining unverified proof data, and can allocate the selected one piece of proof data to the subprocess. The subprocess can obtain the proof data allocated to the subprocess by the main process; can continue to verify the allocated proof data; and can continue to feed back a verification result to the main process, until all the proof data in the transaction data is verified. As such, the proof data can be dynamically allocated, increasing a speed of verifying the proof data.

Figure 3:
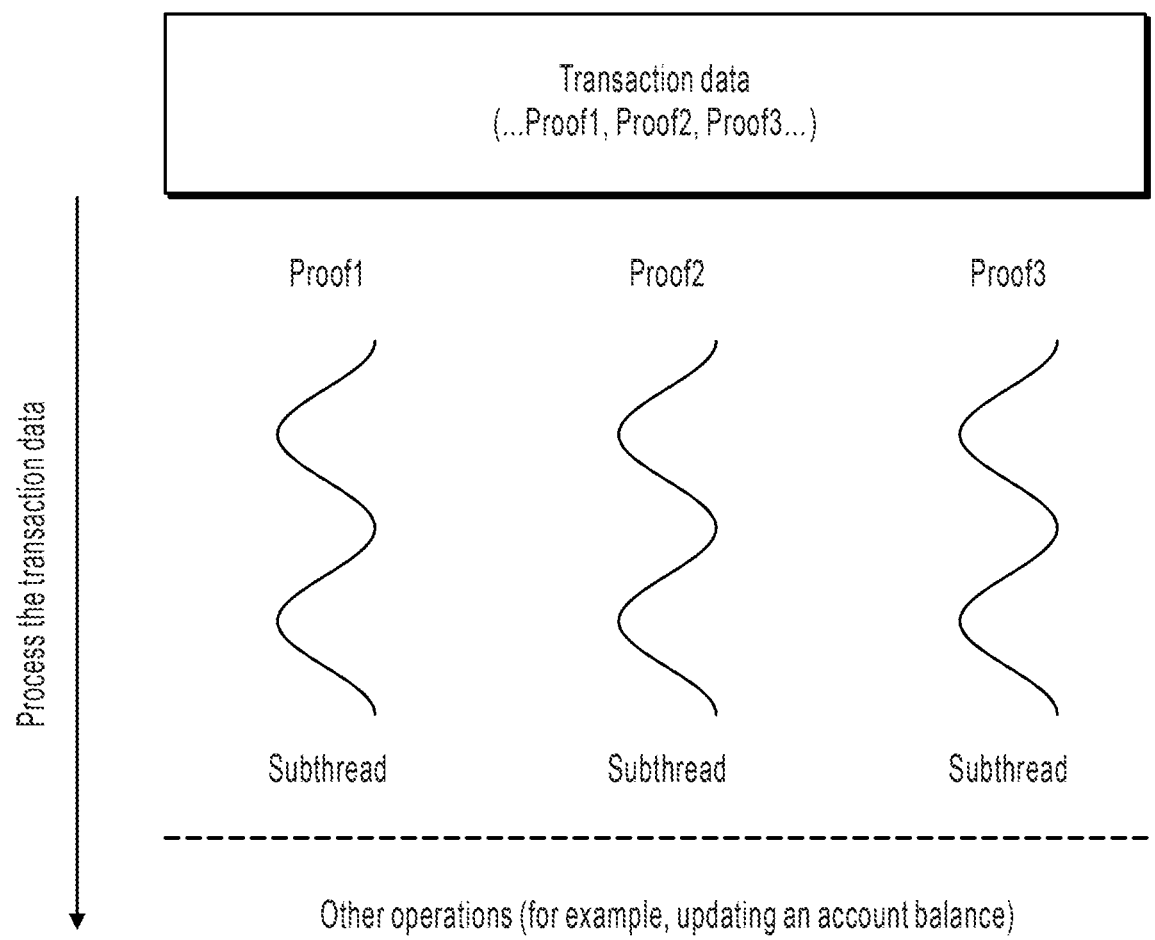
FIG. 3 is a schematic diagram of verifying a plurality of proof data in parallel by using multiple threads, according to an implementation of the present specification.

References are made to FIG. 3. In another implementation form of the present implementation, by invoking the verification program deployed in the blockchain, the consensus blockchain node can verify the plurality of proof data in the transaction data in parallel by using a plurality of threads. Specifically, based on the number of pieces of proof data in the transaction data, the main thread of the consensus blockchain node can create a plurality of subthreads. Each subthread can verify at least one piece of the plurality of proof data. The number of created subthreads can be less than or equal to the number of pieces of proof data in the transaction data. The specific number of created subthreads can be considered comprehensively based on a calculation capability of the blockchain node and a processing timeliness demand of the transaction data. After all proof data in the transaction data has been verified, the main thread can destroy the plurality of created subthreads. Because the plurality of subthreads can be executed in parallel, the plurality of proof data in the transaction data can be verified in parallel. It is worthwhile to note that, in the present implementation, the execution body of S11 can be understood as the main thread of the consensus blockchain node.

In an example scenario, the main thread can allocate the plurality of proof data in the transaction data to the plurality of created subthreads at a time. Each subthread can obtain at least one piece of proof data allocated to the subthread by the main thread; can verify the allocated proof data; and can feed back a verification result to the main thread. For example, the transaction data can include N pieces of proof data, where N is a natural number greater than 1. The main thread can create N subthreads and can allocate one piece of proof data to each subthread. Each subthread can obtain the proof data allocated to the subthread by the main thread; can verify the allocated proof data; and can feed back a verification result to the main thread. For another example, the transaction data can include N pieces of proof data, where N is a natural number greater than 1. The main thread can create Y subthreads, where Y is a natural number less than N. The main thread can select one or more subthreads from the Y subthreads, and allocate a plurality of proof data to the selected subthreads; and can allocate one piece of proof data to the remaining subthreads. Each subthread can obtain the proof data allocated to the subthread by the main thread; can verify the allocated proof data; and can feed back a verification result to the main thread.

In another example scenario, the main thread can dynamically allocate the plurality of proof data in the transaction data to the plurality of created subthreads. Specifically, the main thread can allocate one piece of proof data to each subthread. Each subthread can obtain the proof data allocated to the subthread by the main thread; can verify the allocated proof data; and can feed back a verification result to the main thread. After receiving the verification result fed back by the subthread, the main thread can select one piece of proof data from the remaining unverified proof data, and can allocate the selected one piece of proof data to the subthread. The subthread can obtain the proof data allocated to the subthread by the main thread; can continue to verify the allocated proof data; and can feed back a verification result to the main thread. As such, the proof data can be dynamically allocated, increasing a speed of verifying the proof data.

According to the data processing method in the present implementation, the consensus blockchain node can obtain the transaction data to be processed; and when the transaction data includes a plurality of proof data, invoke a verification program deployed in the blockchain, to verify the plurality of proof data in parallel. As such, the verification program deployed in the blockchain can verify the plurality of proof data in the transaction data in parallel, thereby increasing a speed of processing the transaction data and increasing an overall throughput of the blockchain.

Figure 4:
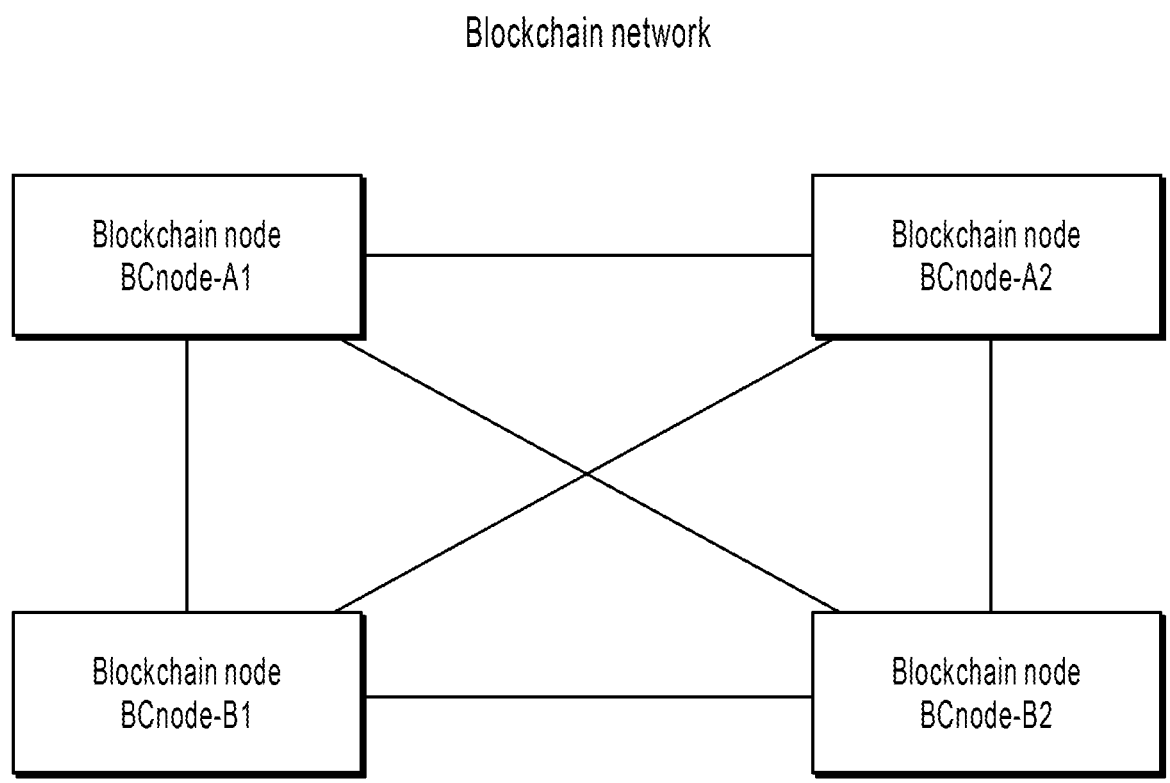
FIG. 4 is a schematic diagram illustrating a blockchain network, according to an implementation of the present specification.
Figure 5:
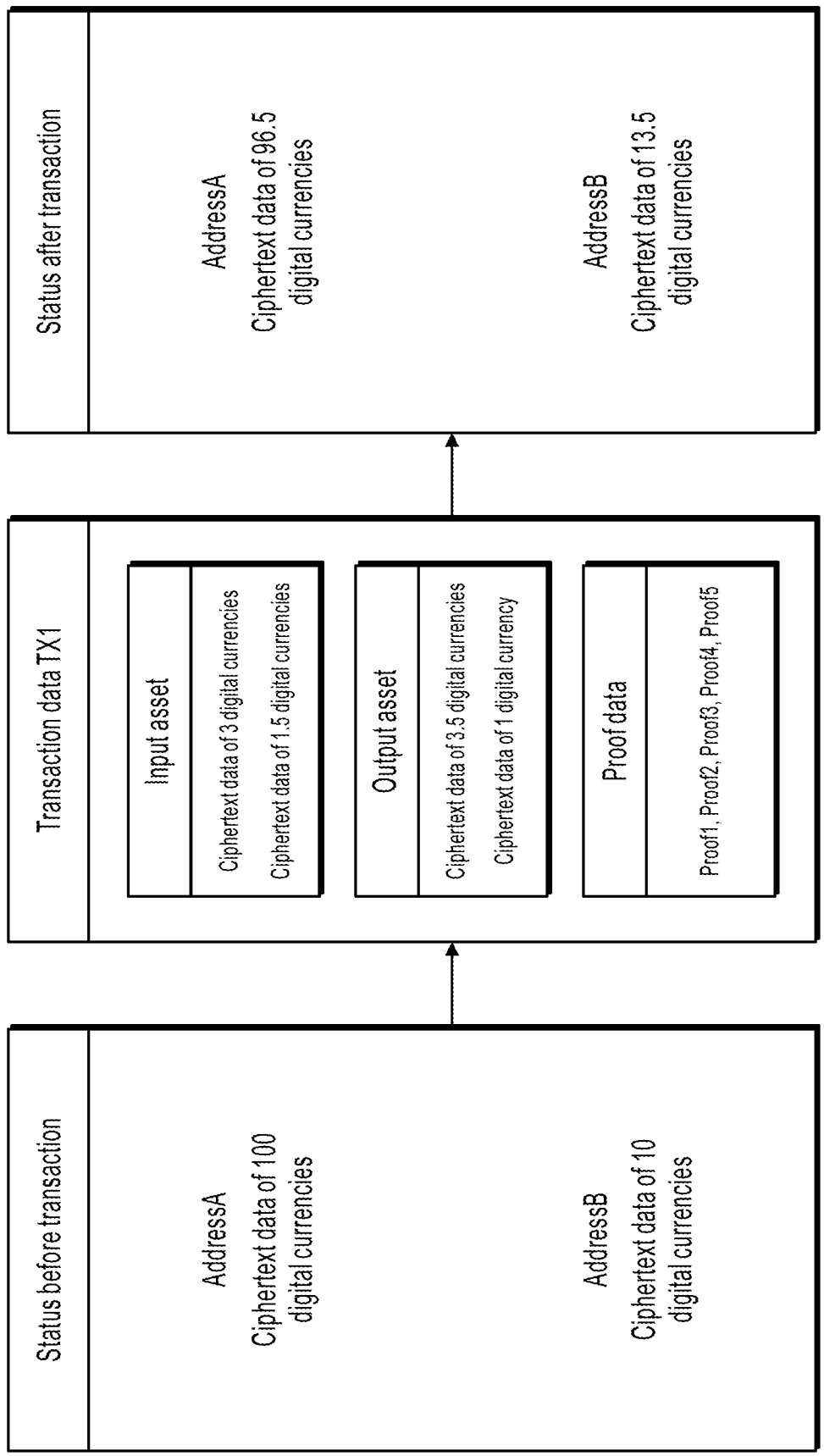
FIG. 5 is a schematic diagram of processing transaction data, according to an implementation of the present specification.

References are made to FIG. 4 and FIG. 5. The following describes an example scenario of an implementation of the present specification.

In the example scenario, the blockchain can protect privacy. The blockchain can be implemented based on the UTXO model. A verification script can be deployed in the blockchain. A blockchain network can include blockchain nodes BCnode-A1, BCnode-A2, BCnode-B1, and BCnode-B2. The blockchain nodes BCnode-A1 and BCnode-A2 can belong to institution A. The blockchain nodes BCnode-B1 and BCnode-B2 can belong to institution B. An account of institution A in the blockchain can be represented as an address AddressA, and an account of institution B in the blockchain can be represented as an address AddressB.

The number of digital currencies owned by AddressA can be 100, and the number of digital currencies owned by AddressB can be 10. Because the blockchain can protect privacy, the number of assets owned by AddressA can be represented as ciphertext data of 100 digital currencies and the number of assets owned by AddressB can be represented as ciphertext data of 10 digital currencies.

In the example scenario, when a consensus trigger condition (e.g., after a specific time period) is satisfied, the blockchain node BCnode-A1 of the blockchain nodes in the blockchain network can be selected as a consensus blockchain node based on a consensus mechanism. The consensus blockchain node BCnode-A1 can obtain the to-be-processed transaction data TX1, TX2, and TX3 from the transaction pool.

The transaction data TX1 is used to transfer 3.5 digital currencies from AddressA to AddressB. The input assets of the transaction data TX1 can include 3 digital currencies and 1.5 digital currencies. The output assets of the transaction data TX1 can include 3.5 digital currencies and 1 digital currency. The 3.5 digital currencies of the output assets are used to perform transfer to AddressB, and 1 digital currency of the output assets is used to give change to AddressA. Because the blockchain can protect privacy, the transaction data TX1 can include the following: ciphertext data of 3 digital currencies in the input assets, ciphertext data of 1.5 digital currencies in the input assets, ciphertext data of 3.5 digital currencies in the output assets, ciphertext data of 1 digital currency in the output assets, zero knowledge proof data Proof1, zero knowledge proof data Proof2, zero knowledge proof data Proof3, zero knowledge proof data Proof4, and zero knowledge proof data Proof5. The zero knowledge proof data Proof1 is used to verify that the 3 digital currencies in the input assets exist and have not been used. The zero knowledge proof data Proof2 is used to verify that the 1.5 digital currencies in the input assets exist and have not been used. The zero knowledge proof data Proof3 is used to verify that AddressA has permission to use the 3 digital currencies in the input assets. The zero knowledge proof data Proof4 is used to verify that AddressA has permission to use the 1 digital currency in the input assets. The zero knowledge proof data Proof5 is used to verify that the input assets are equal to the output assets.

The data included in the transaction data TX2 and TX3 is similar to the data included in the transaction data TX1, and details are omitted here for simplicity.

In the example scenario, during processing of the transaction data TX1, the consensus blockchain node BCnode-A1 can invoke a verification script deployed in the blockchain by using the zero knowledge proof data Proof1, the zero knowledge proof data Proof2, the zero knowledge proof data Proof3, the zero knowledge proof data Proof4, and the zero knowledge proof data Proof5 as input parameters, to verify the zero knowledge proof data Proof1, the zero knowledge proof data Proof2, the zero knowledge proof data Proof3, the zero knowledge proof data Proof4, and the zero knowledge proof data Proof5 in parallel. A specific process of executing the verification script is as follows:

The main thread of the consensus blockchain node BCnode-A1 can create five subthreads: Thread1, Thread2, Thread3, Thread4, and Thread5; can allocate the zero knowledge proof data Proof1 to Thread1; can allocate the zero knowledge proof data Proof2 to Thread2; can allocate the zero knowledge proof data Proof3 to Thread3; can allocate the zero knowledge proof data Proof4 to Thread4; and can allocate the zero knowledge proof data Proof5 to Thread5. Thread1 can obtain the zero knowledge proof data Proof1 allocated by the main thread; can verify the zero knowledge proof data Proof1; and can feed back information indicating verification success to the main thread. Thread2 can obtain the zero knowledge proof data Proof2 allocated by the main thread; can verify the zero knowledge proof data Proof2; and can feed back information indicating verification success to the main thread. Thread3 can obtain the zero knowledge proof data Proof3 allocated by the main thread; can verify the zero knowledge proof data Proof3; and can feed back information indicating verification success to the main thread. Thread4 can obtain the zero knowledge proof data Proof4 allocated by the main thread; can verify the zero knowledge proof data Proof4; and can feed back information indicating verification success to the main thread. Thread5 can obtain the zero knowledge proof data Proof5 allocated by the main thread; can verify the zero knowledge proof data Proof5; and can feed back information indicating verification success to the main thread. After obtaining the information indicating verification success fed back by the subthreads Thread1, Thread2, Thread3, Thread4, and Thread5, the main thread can destroy the subthreads Thread1, Thread2, Thread3, Thread4, and Thread5. Afterwards, the consensus blockchain node BCnode-A1 can update the number of assets owned by AddressA, and can update the number of assets owned by AddressB.

The processing of the transaction data TX2 and TX3 is similar to the processing of the transaction data TX1, and details are omitted here for simplicity.

In the example scenario, the consensus blockchain node BCnode-A1 can create a data block that includes the transaction data TX1, TX2, and TX3; and can store the created data block as a new data block on the blockchain.

Figure 6:
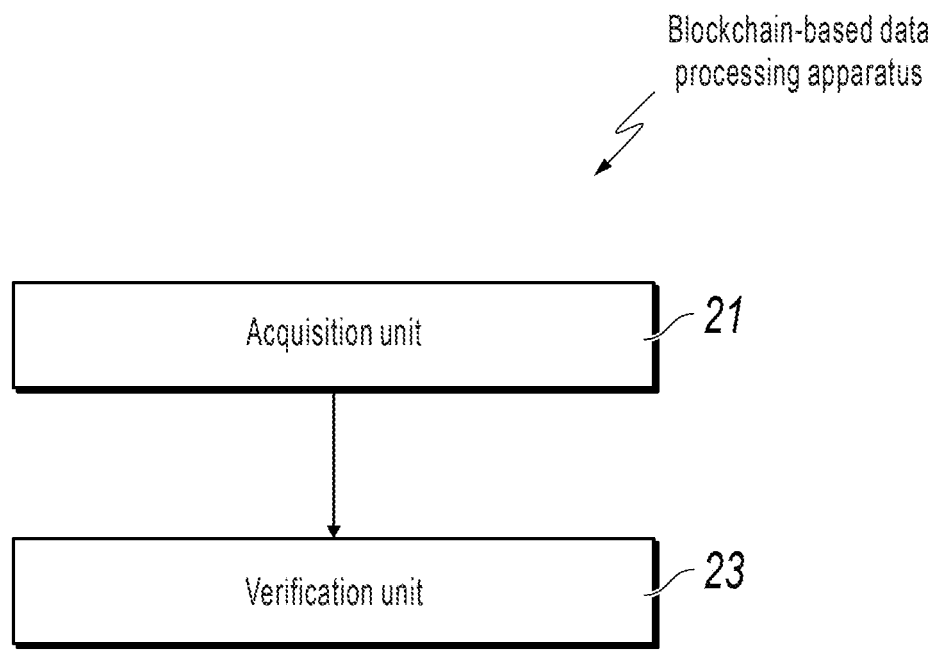
FIG. 6 is a schematic diagram illustrating a data processing apparatus, according to an implementation of the present specification.

The following describes an implementation of a data processing apparatus in the present specification. References are made to FIG. 6. The present implementation can be applied to the blockchain node, and can specifically include the following units: an acquisition unit 21, configured to obtain transaction data to be processed; and a verification unit 23, configured to: when the transaction data includes a plurality of proof data, invoke a verification program deployed in the blockchain, to verify the plurality of proof data in parallel.

Figure 7:
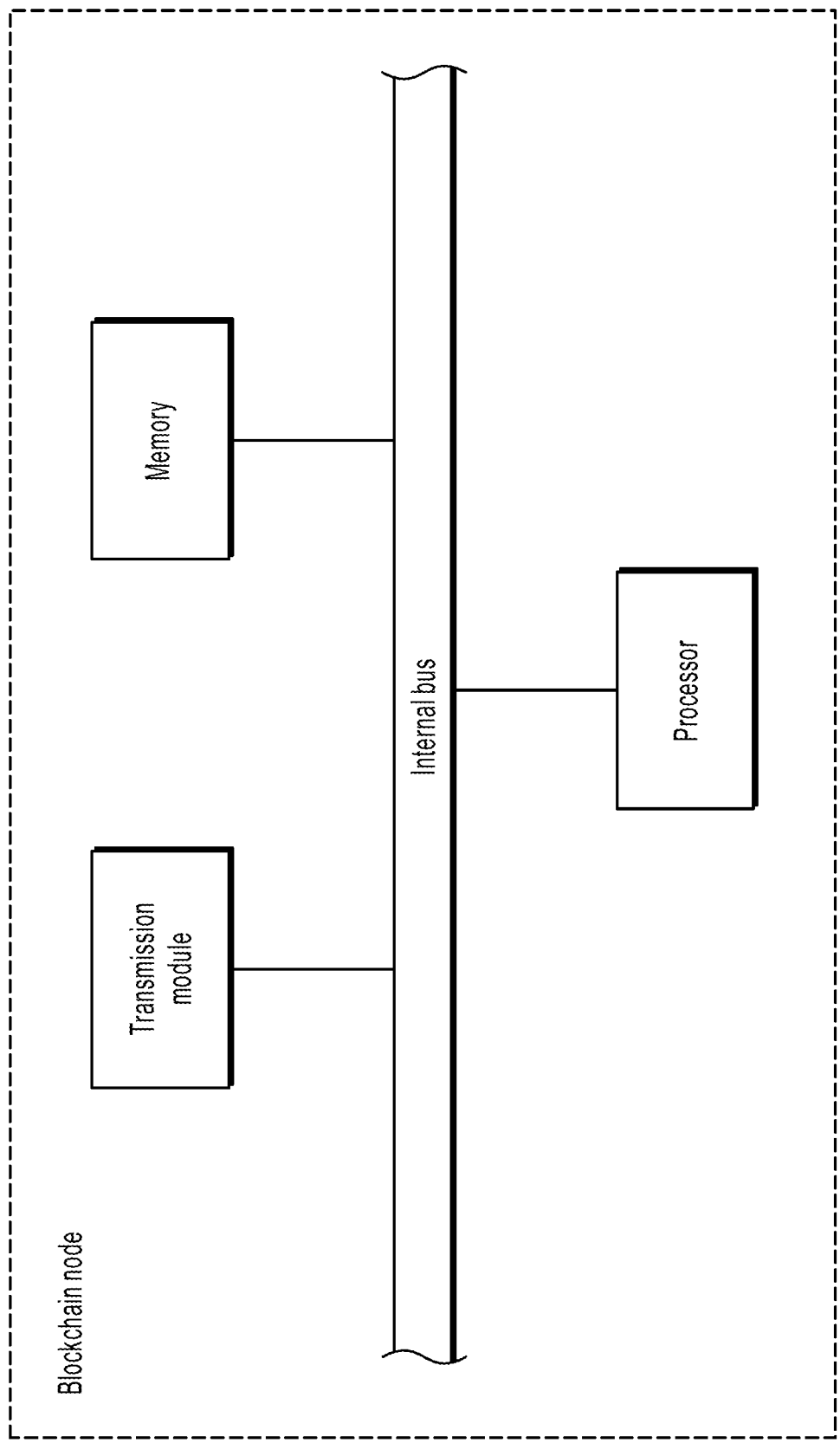
FIG. 7 is a schematic diagram illustrating a blockchain node, according to an implementation of the present specification.

The following describes an implementation of a blockchain node in the present specification. FIG. 7 is a schematic diagram of a hardware structure of a blockchain node in the implementation. As shown in FIG. 7, the blockchain node can include one or more processors (only one processor is shown in the figure), one or more memories, and one or more transmission modules. Certainly, a person of ordinary skill in the art understands that the hardware structure shown in FIG. 7 is merely an example, and does not limit the hardware structure of the previous described blockchain node. In practice, the blockchain node can further include more or less components or units than those shown in FIG. 7, or can have a configuration different from that shown in FIG. 7.

The memory can include a high-speed random access memory, or can further include non-volatile memories, such as one or more magnetic storage devices, flash memories, or other non-volatile solid-state memories. Certainly, the memory can further include a remotely disposed network memory. The remotely disposed network memory can be connected to the blockchain node by using a network such as the Internet, an intranet, a local area network, or a mobile communications network. The memory can be configured to store a program instruction or module of application software, for example, a program instruction or module corresponding to the data processing method in some implementations of the present specification.

The processor can be implemented in any suitable methods. For example, the processor can take the form of a microprocessor or processor, a computer readable medium storing computer readable program code (such as software or firmware) executable by the microprocessor or processor, a logic gate, a switch, an application specific integrated circuit (ASIC), a programmable logic controller, and an embedded microcontroller. The processor can read and execute the program instruction or module in the memory.

The transmission module can be configured to perform data transmission via a network such as the Internet, an intranet, a local area network, or a mobile communications network.

It is worthwhile to note that the implementations in the present specification are progressively described, for the same or similar parts in some implementations, references can be made to each other, and each implementation focuses on a difference from other implementations. In particular, the apparatus implementation and the blockchain node implementation are basically similar to the data processing method implementation, and therefore are described briefly; for related parts, references can be made to the related descriptions in the data processing method implementation.

In addition, it can be understood that, after reading the present specification document, a person skilled in the art can figure out any combination of some or all of the implementations enumerated in the present specification without creative efforts, and these combinations also fall within the disclosure and protection scopes of the present specification.

In the 1990s, whether a technical improvement is a hardware improvement (for example, an improvement to circuit structures, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the previous implementations can be implemented by using a computer chip or an entity, or can be implemented by using a product having a certain function.

The system, apparatus, module, or unit illustrated in the previous implementations can be implemented by using a computer chip or an entity, or can be implemented by using a product having a certain function. A typical implementation device is a computer. Specifically, the computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

It can be seen from the descriptions of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (can be a personal computer, a server, or a network device) to perform the methods described in some implementations or in some parts of the implementations of the present specification.

The present specification can be applied to many general-purpose or dedicated computer system environments or configurations, for example, a personal computer, a server computer, a handheld device or a portable device, a tablet device, a multi-processor system, a microprocessor-based system, a set-top box, a programmable consumer electronic device, a network PC, a minicomputer, a mainframe computer, and a distributed computing environment including any one of the previous systems or devices.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

Although the present specification is described by using the implementations, a person of ordinary skill in the art knows that many variations of the present specification can be made without departing from the spirit of the present specification. It is expected that the appended claims include these variations without departing from the spirit of the present specification.

What is claimed is:

1. A computer-implemented method for blockchain-based data processing, comprising:
    obtaining a first piece of transaction data to be processed by a consensus blockchain node of a blockchain, wherein the first piece of transaction data comprises ciphertext data of a transaction and a plurality of pieces of proof data that are used to verify the ciphertext data of the transaction;
    processing the first piece of transaction data, wherein processing the first piece of transaction data comprises:
    determining that the first piece of transaction data comprise the plurality of pieces of proof data;
    in response to determining that the first piece of transaction data comprises the plurality of pieces of proof data, invoking a verification program deployed in the blockchain and verifying the plurality of pieces of proof data in parallel by the consensus blockchain node; and
    after successfully verifying that the plurality of pieces of proof data in parallel by the consensus blockchain node, updating a processing result of the transaction; and
    after processing the first piece of transaction data is complete, generating a block of the blockchain, wherein the block comprises the first piece of transaction data.

2. The computer-implemented method according to claim 1, wherein the plurality of pieces of proof data comprise zero knowledge proof data.

3. The computer-implemented method according to claim 1, wherein the blockchain is implemented based on an unspent transaction output (UTXO) model and the verification program comprises a script, or
    the blockchain is implemented based on an account model and the verification program comprises a smart contract.

4. The computer-implemented method according to claim 1, wherein:
    the blockchain is implemented based on a UTXO model, and
    the plurality of pieces of proof data further comprises one or more of:
        first proof data indicating whether an input asset of the transaction exists and has not been used,
        second proof data indicating whether an initiator of the transaction has permission to use the input asset of the transaction, or
        third proof data indicating whether the input asset of the transaction is equal to an output asset; or
    the blockchain is implemented based on an account model, and
    the plurality of pieces of proof data comprises one or more of:
        fourth proof data indicating whether a transaction amount is not less than 0, or
        fifth proof data indicating whether the transaction amount is not greater than an account balance of the initiator of the transaction.

5. The computer-implemented method according to claim 1, wherein the invoking the verification program deployed in the blockchain and verifying the plurality of pieces of proof data in parallel comprises:
    creating a plurality of subprocesses; and
    verifying, by each subprocess of the plurality of subprocesses, at least one piece of the plurality of pieces of proof data.

6. The computer-implemented method according to claim 5, wherein the method further comprises:
    allocating at least one piece of proof data to the each subprocess of the plurality of subprocesses, wherein verifying, by the each subprocess, the at least one piece of the plurality of pieces of proof data comprises verifying, by the each subprocess, a piece of proof data allocated to the each subprocess.

7. The computer-implemented method according to claim 5, wherein a total number of subprocesses created is less than or equal to a total number of the plurality of pieces of proof data in the first piece of transaction data.

8. The computer-implemented method according to claim 1, wherein the invoking the verification program deployed in the blockchain and verifying the plurality of pieces of proof data in parallel comprises:
    creating a plurality of subthreads; and
    verifying, by each subthread of the plurality of subthreads, at least one piece of the plurality of pieces of proof data.

9. The computer-implemented method according to claim 8, wherein the method further comprises:
    allocating the at least one piece of the plurality of pieces of proof data to the each subthread of the plurality of subthreads, wherein verifying, by the each subthread of the plurality of subthreads, the at least one piece of the plurality of pieces of proof data comprises verifying, by the each subthread, a piece of proof data allocated to the each subthread.

10. The computer-implemented method according to claim 8, wherein a total number of subthreads created is less than or equal to a total number of the plurality of pieces of proof data in the first piece of transaction data.

11. A computer-implemented system, comprising: one or more processors; and
    one or more computer-readable memories coupled to the one or more processors and having instructions stored thereon that are executable by the one or more processors to perform one or more operations comprising:

obtaining a first piece of transaction data to be processed by a consensus blockchain node of a blockchain; wherein the first piece of transaction data comprises ciphertext data of a transaction and a plurality of pieces of proof data that are used to verify the ciphertext data of the transaction;

processing the first piece of transaction data, wherein processing the first piece of transaction data comprises:

determining that the first piece of transaction data comprise the plurality of pieces of proof data;

in response to determining that the first piece of transaction data comprises the plurality of pieces of proof data, invoking a verification program deployed in the blockchain and verifying the plurality of pieces of proof data in parallel by the consensus blockchain node; and after successfully verifying that the plurality of pieces of proof data in parallel by the consensus blockchain node, updating a processing result of the transaction; and after processing, the first piece of transaction data is complete, generating a block of the blockchain, wherein the block comprises the first piece of transaction data.

12. The computer-implemented system according to claim 11, wherein the blockchain is implemented based on an unspent transaction output (UTXO) model and the verification program comprises a script.

13. The computer-implemented system according to claim 11, wherein the blockchain is implemented based on an account model and the verification program comprises a smart contract.

14. The computer-implemented system according to claim 11, wherein:
the blockchain is implemented based on a UTXO model, and
the plurality of pieces of proof data comprises one or more of:
first proof data indicating whether an input asset of the transaction exists and has not been used,
second proof data indicating whether an initiator of the transaction has permission to use the input asset of the transaction, or
third proof data indicating whether the input asset of the transaction is equal to an output asset.

15. The computer-implemented system according to claim 11, wherein:
the blockchain is implemented based on an account model, and
the plurality of pieces of proof data further comprises one or more of:
fourth proof data indicating whether a transaction amount is not less than 0, or
fifth proof data that the transaction amount is not greater than an account balance of an initiator of the transaction.

16. A non-transitory, computer-readable medium storing one or more instructions executable by a computer system to perform operations comprising:
obtaining a first piece of transaction data to be processed b a consensus blockchain node of a blockchain, wherein the first piece of transaction data comprises ciphertext data of a transaction and a plurality of pieces of proof data that are used to verify the ciphertext data of the transaction;

processing the first piece of transaction data, wherein processing the first piece of transaction data comprises:

determining that the first piece of transaction data comprise the plurality of pieces of proof data;

in response to determining that the first piece of transaction data comprises the plurality of pieces of proof data, invoking a verification program deployed in the blockchain and verifying the plurality of pieces of proof data in parallel by the consensus blockchain node; and after successfully verifying that the plurality of pieces of proof data in parallel by the consensus blockchain node, updating a processing result of the transaction; and after processing, the first piece of transaction data is complete, generating a block of the blockchain, wherein the block comprises the first piece of transaction data.

17. The non-transitory, computer-readable medium according to claim 16, wherein the invoking the verification program deployed in the blockchain and verifying the plurality of pieces of proof data in parallel comprises:
creating a plurality of subprocesses; and
verifying, by each subprocess of the plurality of subprocesses, at least one piece of the plurality of pieces of proof data.

18. The non-transitory, computer-readable medium according to claim 17, wherein the operations further comprise:
allocating at least one piece of proof data to the each subprocess of the plurality of subprocesses, wherein verifying, by the each subprocess, the at least one piece of the plurality of pieces of proof data comprises verifying, by the each subprocess, a piece of proof data allocated to the each subprocess.

19. The non-transitory, computer-readable medium according to claim 16, wherein the invoking the verification program deployed in the blockchain and verifying the plurality of pieces of proof data in parallel comprises:
creating a plurality of subthreads; and
verifying, by each subthread of the plurality of subthreads, at least one piece of the plurality of pieces of proof data.

20. The non-transitory, computer-readable medium according to claim 19, wherein the operations further comprise:
allocating the at least one piece of the plurality of pieces of proof data to the each subthread of the plurality of subthreads, wherein verifying, by the each subthread of the plurality of subthreads, the at least one piece of the plurality of pieces of proof data comprises verifying, by the each subthread, a piece of proof data allocated to the each subthread.

21. The computer-implemented method according to claim 1, further comprising:
obtaining a second piece of transaction data to be processed by the consensus blockchain node of the blockchain;
processing the first piece of transaction data and the second piece of transaction data in series; and
after serial processing the first piece of transaction data and the second piece of transaction data, generating the block of the blockchain, wherein the block comprises the first piece of transaction data and the second piece of transaction data.

22. The computer-implemented system according to claim 11, wherein the one or more operations further comprise:

obtaining a second piece of transaction data to be processed by the consensus blockchain node of the blockchain;

processing the first piece of transaction data and the second piece of transaction data in series; and after serial processing the first piece of transaction data and the second piece of transaction data, generating the block of the blockchain, wherein the block comprises the first piece of transaction data and the second piece of transaction data.

23. The non-transitory, computer-readable medium according to claim 17, wherein the operations further comprise:

obtaining a second piece of transaction data to be processed by the consensus blockchain node of the blockchain;

processing the first piece of transaction data and the second piece of transaction data in series; and after serial processing the first piece of transaction data and the second piece of transaction data, generating the block of the blockchain, wherein the block comprises the first piece of transaction data and the second piece of transaction data.

\* \* \* \* \*

UNITED STATES PATENT AND TRADEMARK OFFICE
CERTIFICATE OF CORRECTION

PATENT NO.           : 11,115,188 B2
APPLICATION NO.      : 16/776067
DATED                : September 7, 2021
INVENTOR(S)          : Zheng Liu, Lichun Li and Shan Yin It is certified that error appears in the above-identified patent and that said Letters Patent is hereby corrected as shown below:

In the Claims

In Column 13, Line 4, Claim 11, delete "a blockchain;" and insert -- a blockchain, --, therefor.

In Column 13, Line 23, Claim 11, delete "processing," and insert -- processing --, therefor.

In Column 13, Line 63, Claim 16, delete "b" and insert -- by --, therefor.

In Column 14, Line 14, Claim 16, delete "processing," and insert -- processing --, therefor.

Signed and Sealed this
Seventh Day of December, 2021

Drew Hirshfeld
*Performing the Functions and Duties of the*
*Under Secretary of Commerce for Intellectual Property and*
*Director of the United States Patent and Trademark Office*